United States Patent
Thomas et al.

(10) Patent No.: US 7,024,272 B2
(45) Date of Patent: *Apr. 4, 2006

(54) VIRTUAL DESIGN, INSPECT AND GRIND OPTIMIZATION PROCESS

(75) Inventors: Steven M. Thomas, Saginaw, MI (US); Diane M. Landers, Frankenmuth, MI (US)

(73) Assignee: Delphi Technologies, Inc., Troy, MI (US)

(*) Notice: Subject to any disclaimer, the term of this patent is extended or adjusted under 35 U.S.C. 154(b) by 207 days.

This patent is subject to a terminal disclaimer.

(21) Appl. No.: 10/358,870

(22) Filed: Feb. 5, 2003

(65) Prior Publication Data

US 2003/0204285 A1 Oct. 30, 2003

Related U.S. Application Data

(60) Provisional application No. 60/375,787, filed on Apr. 26, 2002, provisional application No. 60/375,621, filed on Apr. 26, 2002.

(51) Int. Cl.
*G06F 19/00* (2006.01)

(52) U.S. Cl. .................. 700/182; 700/98; 700/184
(58) Field of Classification Search ........... 700/182, 700/164, 159, 98, 184, 175; 702/35; 451/5, 451/8–10

See application file for complete search history.

(56) References Cited

U.S. PATENT DOCUMENTS

| | | | |
|---|---|---|---|
| 5,184,426 A * | 2/1993 | Minatani ........................ 45/5 |
| 5,351,196 A | 9/1994 | Sowar et al. ............ 364/474.24 |
| 5,434,791 A | 7/1995 | Koko et al. .................. 364/468 |
| 5,467,293 A | 11/1995 | Summer et al. ............ 364/578 |
| 5,659,493 A | 8/1997 | Kiridena et al. ............ 364/578 |
| 5,691,909 A * | 11/1997 | Frey et al. .................... 700/159 |
| 5,710,709 A | 1/1998 | Oliver et al. ............ 364/474.26 |
| 5,768,136 A | 6/1998 | Fujiwara et al. ........ 364/474.24 |
| 5,793,647 A * | 8/1998 | Hageniers et al. ............ 702/35 |
| 5,808,432 A | 9/1998 | Inoue et al. .................. 318/561 |
| 5,815,154 A | 9/1998 | Hirschtick et al. ........... 345/356 |
| 6,073,056 A | 6/2000 | Gawronski et al. ........... 700/98 |
| 6,120,171 A | 9/2000 | Shaikh .................... 364/468.04 |
| 6,219,049 B1 | 4/2001 | Zuffante et al. ............ 345/339 |
| 6,219,055 B1 | 4/2001 | Bhargava et al. ........... 345/355 |
| 6,263,252 B1 | 7/2001 | St. Ville ....................... 700/98 |
| 6,323,863 B1 | 11/2001 | Shinagawa et al. ......... 345/441 |
| 6,341,153 B1 | 1/2002 | Rivera et al. .................. 378/4 |

(Continued)

OTHER PUBLICATIONS

Roth et al. "Surface swept by toroidal cutter during 5-axis machining" Computer Aided Design vol. 33 No. 1. Jan. 2001, pp. 57-63.*

(Continued)

*Primary Examiner*—Leo Picard
*Assistant Examiner*—Steven R. Gorland
(74) *Attorney, Agent, or Firm*—Michael D. Smith

(57) ABSTRACT

A method for virtual machining and inspection of a three-dimensional virtual workpiece representative of an actual workpiece comprising: creating a three-dimensional tool model; defining a tool path through the virtual workpiece; creating a plurality of two-dimensional slices from the three-dimensional tool model; and passing each of said plurality of two-dimensional slices along the tool path and through the virtual workpiece; wherein material from the virtual workpiece coming into contact with each of said plurality of two-dimensional slices passed there through is subtracted from the virtual workpiece; and conducting a virtual inspection of the virtual work piece.

25 Claims, 16 Drawing Sheets

U.S. PATENT DOCUMENTS

| | | | |
|---|---|---|---|
| 6,341,996 B1* | 1/2002 | Brien et al. | 451/8 |
| 6,356,800 B1 | 3/2002 | Monz et al. | 700/184 |
| 6,430,455 B1 | 8/2002 | Rebello et al. | 700/105 |
| 6,599,125 B1 | 7/2003 | Freilich et al. | 433/212.1 |
| 6,629,065 B1 | 9/2003 | Gadh et al. | 703/1 |
| 2002/0133252 A1 | 9/2002 | Landers et al. | 700/97 |
| 2002/0133253 A1 | 9/2002 | Landers et al. | 700/98 |
| 2002/0133264 A1 | 9/2002 | Maiteh et al. | 700/182 |
| 2002/0133265 A1 | 9/2002 | Landers et al. | 700/182 |
| 2002/0133266 A1 | 9/2002 | Landers et al. | 700/182 |
| 2002/0133267 A1 | 9/2002 | Landers et al. | 700/182 |
| 2002/0152000 A1 | 10/2002 | Landers et al. | 700/98 |
| 2003/0004596 A1 | 1/2003 | Landers et al. | 700/98 |
| 2003/0033041 A1 | 2/2003 | Richey | 700/98 |
| 2003/0114945 A1 | 6/2003 | Hirano et al. | 700/97 |
| 2003/0204284 A1* | 10/2003 | Thomas et al. | 700/175 |
| 2003/0204286 A1* | 10/2003 | Thomas et al. | 700/182 |

OTHER PUBLICATIONS

Hemmett et al. "A Robust and Efficient Approach to Feedrate Selection for 3-Axis Machining" ASME International Mechanical Engineering Congress and Exposition, Oct. 11, 2000 Walt Disney World Dolphin, Orlando, Fl.pp. 1-15.*

Solid Edge User's Guide Version 6, MU28900-ENG, by Unigraphics Solutions, 1998, pp. 28, 29, 33, 90, 91, 96, 157, and 178.

Artificial Intelligence (Understanding Computers Series), Time-Life Books, 1986, ISNBN-0-8094-5675-3, pp. 36-43.

U.S. Appl. No. 10/355,310, filed Jan. 31, 2003, Landers et al.

U.S. Appl. No. 10/355,326, filed Jan. 31, 2003, Khurana.

U.S. Appl. No. 10/355,355, filed Jan. 31, 2003, Landers et al.

U.S. Appl. No. 10/355,662, filed Jan. 31, 2003, Landers et al.

U.S. Appl. No. 10/355,749, filed Jan. 31, 2003, Landers et al.

U.S. Appl. No. 10/355,763, filed Jan. 31, 2003, Landers et al.

U.S. Appl. No. 10/358,874, filed Feb. 5, 2003, Thomas et al.

William H. Beyer, Ph.D., editor; CRC Handbook of Mathematical Sciences, 5th Edition, 1978, pp. 354-355.

Sridhar S. Condoor, "Integrating Design in Engineering Graphics Courses Using Feature-Based, Parametric Solid Modeling," ASEE/IEEE Frontiers in Education Conference 12d2-13; 1999; pp. 12d2-13-12d2-17.

Chih-Hsing Chu and Chun-Fong You; "Operation Planning in NC Programming Based on CAD Systems," found at http://dnclab.berkeley.edu/lma/people/chchu/paper/NCoptim.html.

Solid Edge User's Guide Version 12 2002.

What's New in Unigraphics V18.0.5.2 User Guide 2002.

* cited by examiner

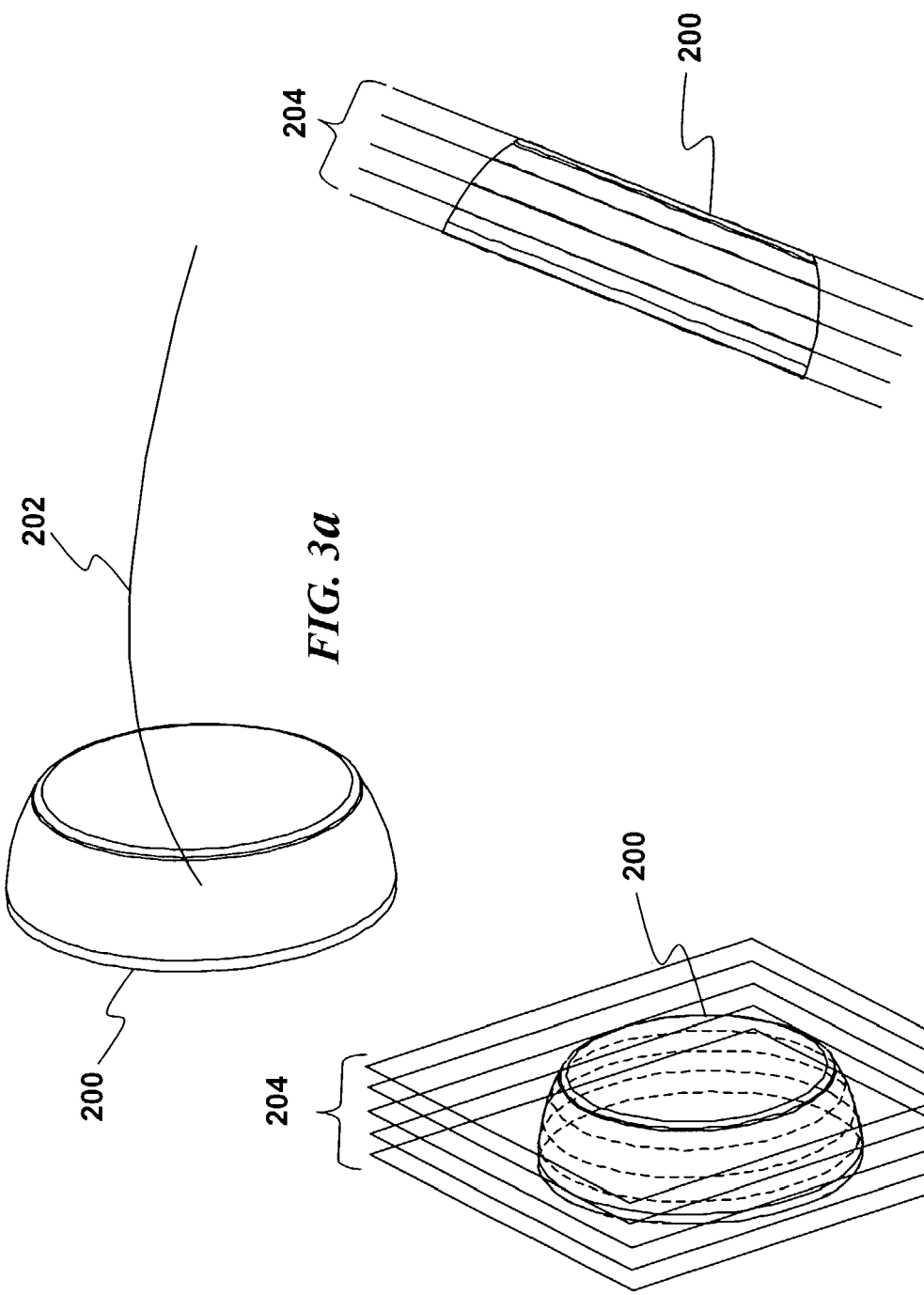

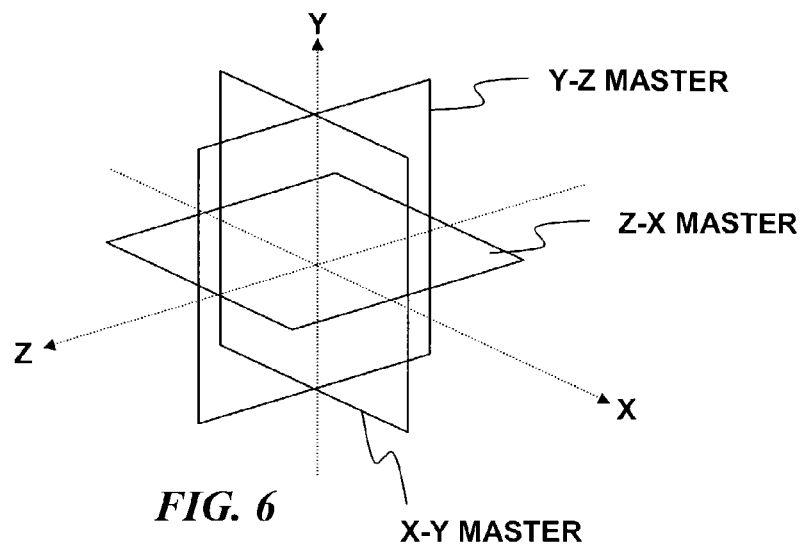
FIG. 6
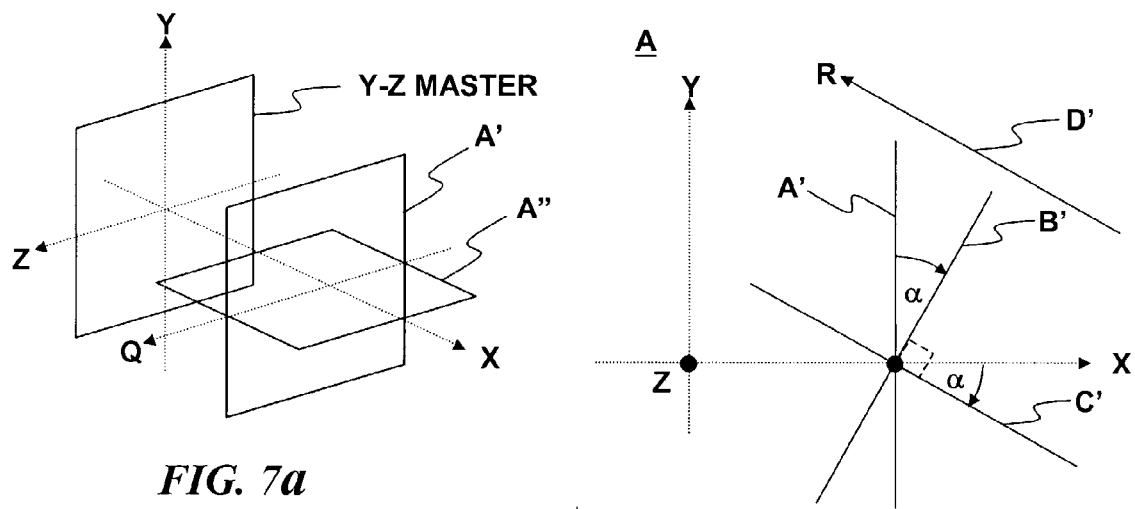
FIG. 7a
FIG. 7b
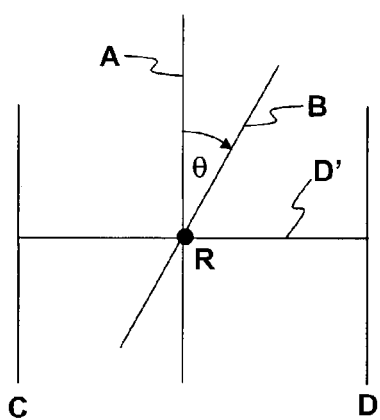
FIG. 7c

VIRTUAL DESIGN, INSPECT AND GRIND OPTIMIZATION PROCESS

CROSS-REFERENCE TO RELATED APPLICATIONS

This application claims the benefit of U.S. Provisional Application Ser. No. 60/375,787 filed Apr. 26, 2002 and U.S. Provisional Application Ser. No. 60/375,621 filed Apr. 26, 2002 the contents of which are incorporated by reference herein in their entirety.

BACKGROUND

The present disclosure relates generally to computer aided design and manufacturing (CAD/CAM) and, more particularly, to a method for modeling, machining, and inspecting complex, three dimensional parts and tool paths through a workpiece.

The cycle of design to machining real parts often takes several weeks to complete and can cost up to several thousands of dollars. In the past, complex tool shapes were generated by hand on a CAD system, which commonly required several iterative steps to get the correct form. The steps might include, design tool e.g., grinder profile and tool path, program the machine for grinding, grind a sample part, and inspect the sample using an inspection apparatus such as a Coordinate Measuring Machine (CMM). This process is repeated until the sample part satisfactorily meets designed requirements and dimensions.

In numerically controlled (NC) milling technology, a tool or cutter is directed through a set of pre-recorded sequential trajectories to fabricate a desired shape from raw stock. This technology is capable of producing free-formed, sculptured surfaces while maintaining tight milling error tolerances. Consequently, NC milling technology is widely used in the production of complicated, high-precision products such as molds, dies, aerospace parts, etc. These products, especially molds and dies, typically influence many other subsequent production processes. In order to improve the accuracy and reliability of NC milling, certain verification methods are used to check milling tool paths for potential problems such as milling error, collision, and improper machining parameters, among others. Analytical methods are implemented to graphically simulate the milling process off-line and, in some cases, verify milling error, tool assembly collision, and other machining parameters. Thus, NC programmers can visualize the shape of milled parts and understand potential problems in an efficient, less expensive, and more accurate way.

Direct solid modeling is one approach used in simulating the material removal process, implemented through direct Boolean difference operations between a solid model of the workpiece and solid models of swept volumes of the milling tool. The milling process may be realistically simulated, resulting in an explicit solid model of the milled workpiece that may be graphically presented and reviewed. Since the milled part is explicitly defined by a solid representation, a subsequent inspection, analysis, and computation of milling error, volume removal rate, or milling dynamics can be readily performed. Although the direct solid modeling approach is theoretically capable of presenting accurate results of NC verification, the applications thereof remain limited. Generally, such limitations result from the complexity of Boolean difference operations between solid entities. The Boolean difference operation requires computation of the intersection between the shells of two solid entities.

Another approach is to represent simple three-dimensional tool shapes (e.g., spheres, cylinders) as a two-dimensional profile that is extruded through a workpiece to provide a real world representation. However, such a simple profile extrusion becomes inapplicable when the tool shape and the tool path are complex. Accordingly, it is desirable to be able to simulate the material removal process for complex tool shapes and paths while overcoming the above limitations.

Additionally, the inspection and analysis of a milled part is generally accomplished with a coordinate measuring machine (CMM), in which a small probe or pointer is used to trace the three-dimensional surfaces of the part in order to measure the specific dimensions thereof. Since such an inspection process assists in decreasing time and expense in the actual manufacturing of parts, it is also desirable to have a similar process for the verification of a mathematical-based, virtual machining application as described above.

Therefore it is desired in the art to provide a method for computer modeling of complex, three dimensional tool paths through a workpiece to facilitate a virtual machining of the workpiece integrated with a process for performing a virtual inspection of a virtually machined workpiece.

SUMMARY

The above discussed and other drawbacks and deficiencies of the prior art are overcome or alleviated by a method for virtual machining and inspection of a three-dimensional virtual workpiece representative of an actual workpiece comprising: creating a three-dimensional tool model; defining a tool path through the virtual workpiece; creating a plurality of two-dimensional slices from the three-dimensional tool model; and passing each of said plurality of two-dimensional slices along the tool path and through the virtual workpiece; wherein material from the virtual workpiece coming into contact with each of said plurality of two-dimensional slices passed there through is subtracted from the virtual workpiece; and conducting a virtual inspection of the virtual work piece.

Further disclosed is a storage medium encoded with a machine-readable computer program code for virtual machining and inspection comprising. The storage medium including instructions for causing a computer to implement the abovementioned method.

Additionally disclosed is a computer data signal for virtual machining and inspection comprising. The computer data signal comprising code configured to cause a processor to implement the abovementioned method.

BRIEF DESCRIPTION OF THE DRAWINGS

Referring to the exemplary drawings wherein like elements are numbered alike in the several Figures:

FIG. 3(a) is a perspective view of an irregularly shaped, exemplary three-dimensional tool model used in accordance with the method shown in FIG. 1;

FIG. 3(b) is another perspective view of the tool model of FIG. 2(a), shown with a series of exemplary slices taken across slice planes thereof;

FIG. 3(c) is a side view illustrating the slice planes of FIG. 2(b);

FIG. 6 is a perspective view of a set of fixed master planes used in accordance with the method of FIG. 5;

FIG. 7(a) is a perspective view of a set of positioning planes used in accordance with the method of FIG. 5;

FIGS. 7(b) and 7(c) illustrate the definition of a pair of cutting planes used in accordance with the method of FIG. 5;

DETAILED DESCRIPTION

Figure 1:
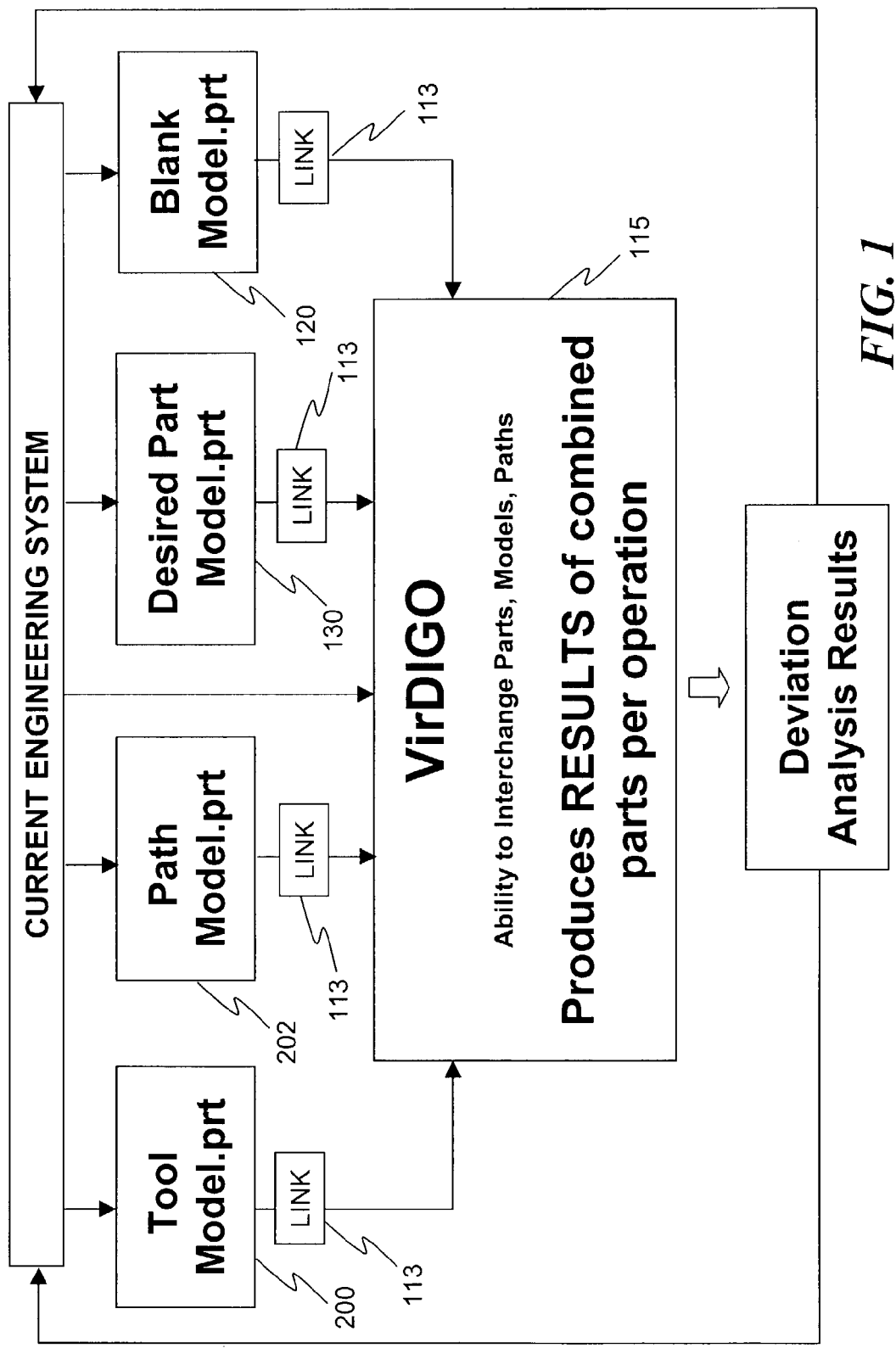
FIG. 1 is a simplified block diagram of an exemplary embodiment of a virtual design, inspection, and grinding or machining optimization process.

Referring initially to FIG. 1, a block diagram of an exemplary embodiment of a process for virtual design, inspection, and grinding or machining optimization is depicted. More specifically, a method for computer modeling of complex, three dimensional tool paths through a workpiece to facilitate a virtual machining of the workpiece integrated with a process for performing a virtual inspection of a virtually machined workpiece. Briefly stated, a three-dimensional (3D) tool model 200 of complex shape is generated preferably employing the horizontally structured modeling and manufacturing processing techniques. Second, a model of a blank, also denoted workpiece or part may be virtual "machined" as described herein. Finally, a virtual inspection of the part may thereafter be conducted to ensure that the machining produces the expected result.

The horizontally structured modeling and manufacturing techniques disclosed permit development of a model of a virtual part and yet readily permit alterations, additions, and deletions of individual features (e.g., holes, bosses, and the like), wherein a change in any one feature is independent of the remaining features. It will be appreciated that the embodiments disclosed herein are illustrated employing horizontally structured modeling and manufacturing processes. However, other techniques are feasible and possible and may be employed albeit while sacrificing the benefits realized from horizontally structured modeling and manufacturing processes. The disclosed method may be implemented on any CAD/CAM software package that supports (a) reference planes or their Cartesian equivalents, (b) parametric modeling or its equivalent, and (c) feature modeling or its equivalents.

Continuing with FIG. 1, in an exemplary embodiment, a template file 115 may be created to facilitate the methodology disclosed herein. For flexibility, initially, each one of the components used herein is virtually linked into the template file 115. It will be appreciated that linking from another file facilitates management of the file size. This linking process uses the horizontally structured modeling part link/unlink functionality described in commonly assigned, U.S. patent application Ser. No. 10/032,960, Publication No. US 2002-0133803 A1 filed Oct. 24, 2001, entitled "Enhancement to Horizontally-Structured CAD/CAM Modeling", by Diane M. Landers et al. and, U.S. patent application Ser. No. 10/033,163, filed Oct. 24, 2001, Publication No. US 2002-0133267 A1 entitled "Enhancement to Horizontally Structured Manufacturing Process Modeling", by Diane M. Landers et al., the disclosures of which are incorporated by reference herein in their entirety.

Figure 11:
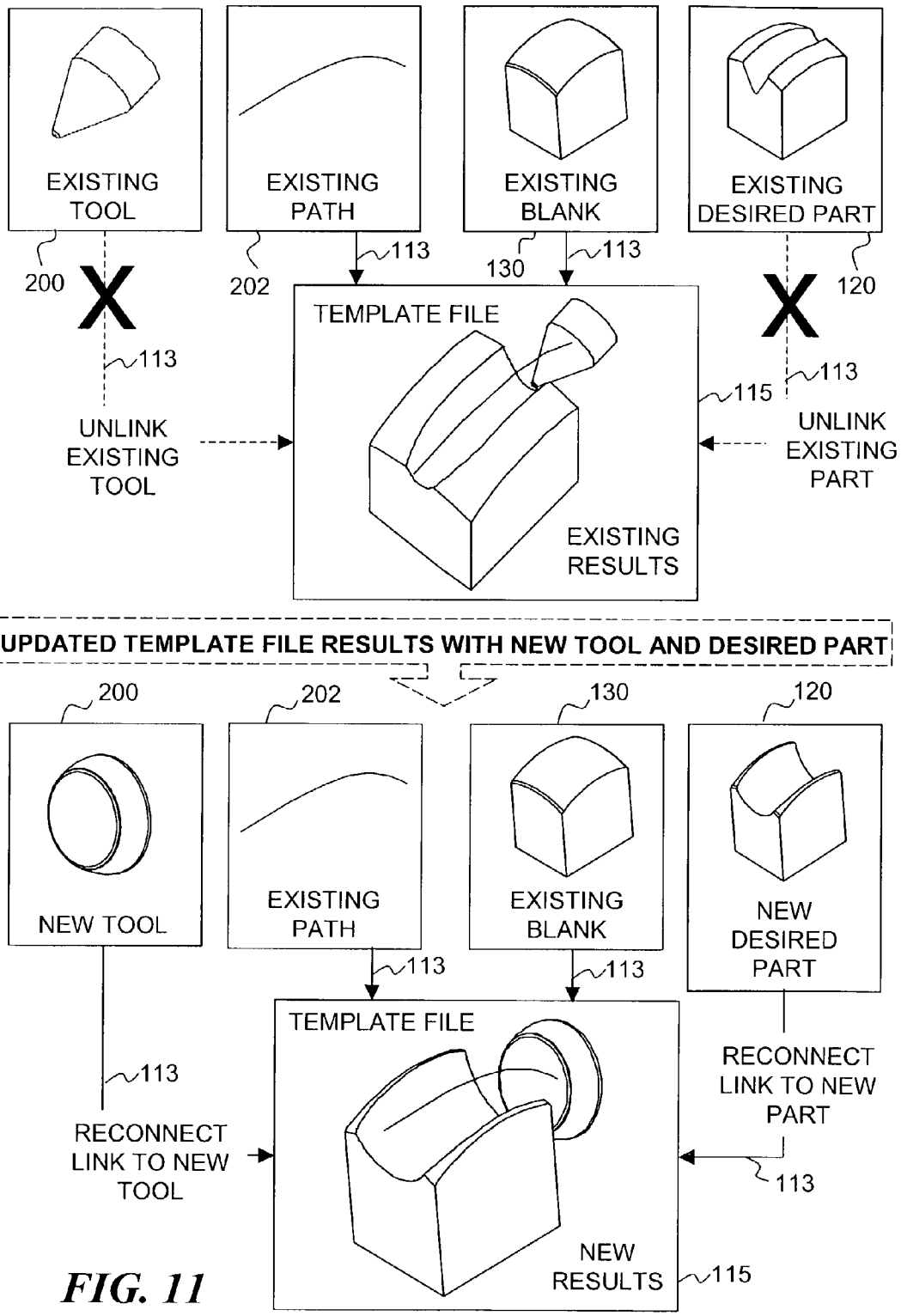
FIG. 11 illustrates an alternative embodiment employing part link/unlink horizontally structured modeling.

Referring also to FIG. 11, the part link/unlink functionality allows various modeling elements, including but not limited to, point, line, curve circle and the like, as well as references, datums, coordinate systems, virtual blanks, models, tools and the like as well as combinations including at least one of the foregoing to be exchanged/interchange with other parts, tools, models, and the like. For instance, as shown in the figure, if a new tool is desired over an existing one, the tool can simply be unlinked from the template file 115 and part, and replaced with the new tool model. The new tool model is re-linked 113 into the template file 115, where all functions of methodology disclosed herein for virtual design, inspection, and grinding or machining optimization are readily updated using the new tool shape. It will be appreciated that the updating based on a new tool shape, for example, may be automated or manually initiated. Additional details of the feature and characteristics of the part link/unlink 113 capability as applicable to the embodiments disclosed herein will be disclosed herein below.

Returning to FIG. 1 a tool model 200 is linked into the template file 115. A tool path 202 is also created or linked 113 into the template file 115. The tool path 202 defines the path that the tool is to follow while performing the virtual machining. Additionally, a 3D solid model of the actual blank or workpiece denoted a virtual blank 120 is generated and/or linked 113 into the template file 115. Optionally, a product model 130 of the ideal part is generated or linked 113 into the template file 115. The product model 130 may be employed to facilitate inspection of the virtual machining of the virtual blank 120 and thereby identifying how accurately the virtual machined part matches the ideal part. In this manner, an operator may now compare a virtual machined part to the ideal part as designed. Advantageously, the virtual design, inspection, and grinding or machining optimization methodology disclosed herein provides the machining and inspection results virtually in minutes that have traditionally taken weeks and potentially thousands of dollars to produce. Moreover, this methodology removes the manual iterative cycles of design to prototype process.

Continuing with FIG. 1, in an exemplary embodiment, more particularly, a form of virtual machining may comprise modeling of complex, tool and tool paths through a workpiece (particularly when the desired result requires more complex machining and material removal than milling and shaping alone). Such a method of virtual machining is disclosed in commonly assigned U.S. patent application Ser. No. 10/358,874 U.S. Provisional Patent Application Ser. No. 60/375,787, filed Apr. 26, 2002, entitled "Math Base Metal Removal of Complex Tool Shapes Along Complex Paths", by Steven Thomas and Diane Landers, the disclosures of which are incorporated by reference herein in their entirety.

The three-dimensional (3D), solid, tool model 200 may be partitioned into a series of two-dimensional (2D) "slices" or layers. The slices are then each swept along a defined tool path and through the virtual workpiece. With the passing of each slice, material that that slice intersects with on the workpiece is subtracted (i.e., removed). The greater the number of 2D slices used, the greater the accuracy of the virtual machining since, as the number of 2D slices approaches infinity, the aggregate slices of the tool model approach and exact representation of the 3D solid of the tool model.

Continuing once again with FIG. 1, as mentioned above, in an exemplary embodiment, the virtual design, inspection, and grinding or machining optimization methodology disclosed integrates virtual inspection with the abovementioned virtual machining. The methodology for this virtual inspection is disclosed in commonly assigned U.S. Patent No. U.S. patent application Ser. No. 10/358,873, U.S. Provisional Patent Application Ser. No. 60/375,621, filed Apr. 26, 2002, entitled "Virtual Inspection of Math Based Machined Parts", by Steven Thomas and Diane Landers, the disclosures of which are incorporated by reference herein in their entirety.

Briefly stated, the virtual inspection process is accomplished and controlled through a series of master planes, positioning planes and cutting planes. Three master planes (x-y, y-z and z-x) serve as a fixed reference. From these fixed reference planes, a corresponding set of positioning planes are offset and rotated from the master planes to provide positioning for a pair of cutting planes. The cutting planes are defined to be non-parallel and therefore intersect along an "inspection" line that is used as a virtual inspection probe. This inspection line is then passed through a virtually machined part to be measured, wherein an inspection point on the part is defined by the intersection of the inspection line and the part. By changing the positioning of one or both of the cutting planes, the inspection line is caused to be swept through a selected area of the virtual part for data collection. Optionally, for comparison the same process may be employed with an ideal part model (as designed) in order to collect reference points for comparison between an ideal design part and the machined part. Advantageously, this methodology facilitates actual machining of a real part by providing a means for complex virtual machining and virtual inspection. Virtual machining and inspection saves time and cost by eliminating costly reworks and redesigns associated with design and machining recursions typical of industry.

Returning now to FIG. 1, a discussion of the integrated elements of the methodology disclosed herein is provided. First, a methodology of virtual machining for a complex tool shape and tool path. Second, an alternative horizontally structured method for defining a tool path. Finally, a method of virtual inspection. Integration of these methodologies or elements thereof provides a designer of a rapid methodology for modeling, virtual prototyping a part, and inspection to design criteria without the significant expense associated with actual prototype machining.

Virtual Machining of Complex Tool Paths

Figure 2:
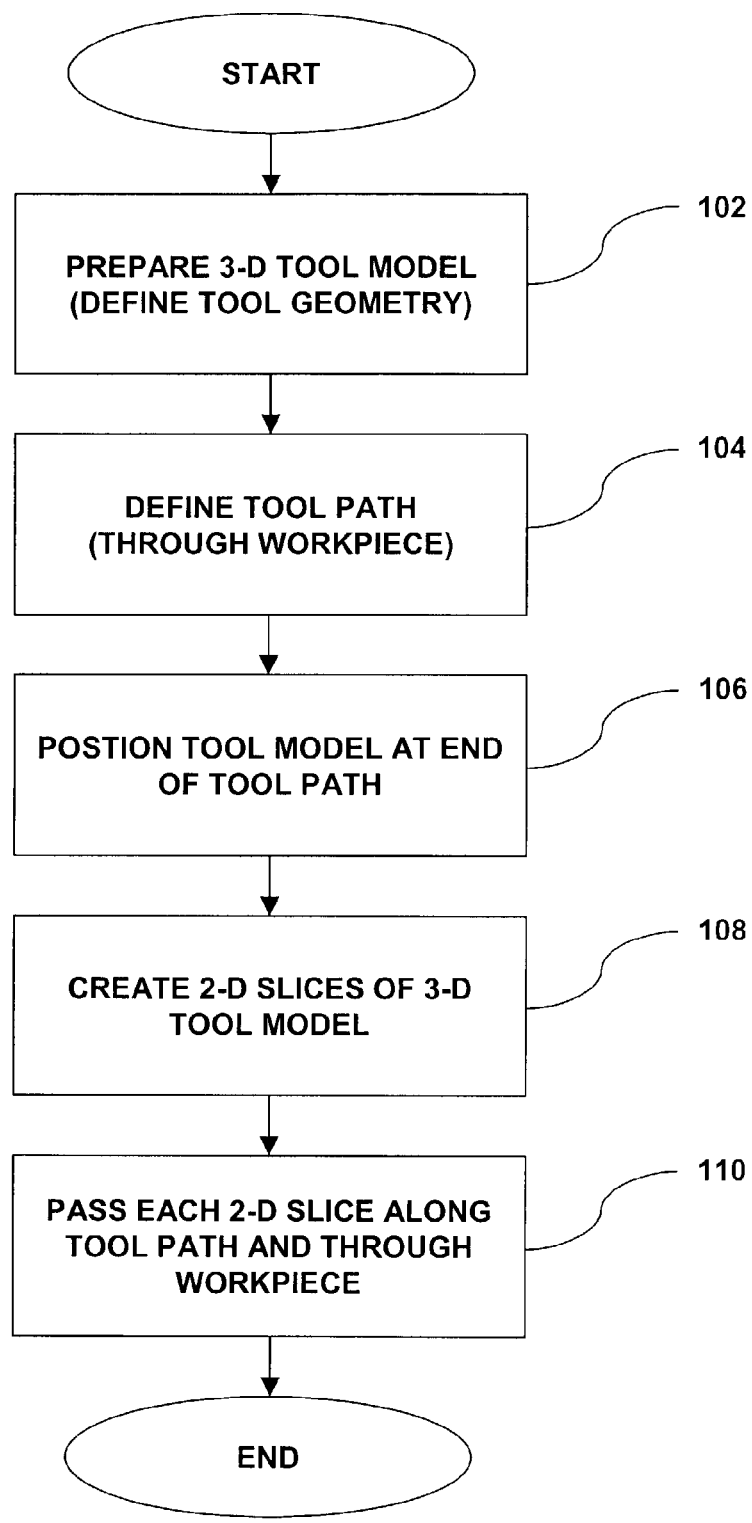
FIG. 2 is a block diagram illustrating a method for modeling complex, three dimensional tool paths through a workpiece, in accordance with an embodiment of the invention.

Referring initially to FIG. 1 and to FIG. 2, there is shown a block diagram that illustrates a method 100 for modeling complex, three dimensional tool paths through a workpiece also denoted a blank. A 3D solid model of the physical blank or workpiece upon which the virtual machining disclosed herein will be performed denoted a virtual blank 10 is employed to initiate the virtual machining. Virtual machining processes "machine" material off the virtual blank 10 similar to the actual machining of the physical part. A master process model 20 is a 3D solid model including the virtual machining steps. The master process model 20 starts as replica of a virtual blank 10 and includes all of the virtual machining processes to the completed model of the machined part. At block 102, a three dimensional tool model 200 is computer generated and a tool geometry is defined. Then, a tool path 202 for the virtual tool of the tool model 200 is defined with respect to the workpiece, or more specifically the virtual blank 10 or master process model 20, as shown in block 104. At block 106, the tool model 200 is positioned at a first end of the tool path 202 such that a reference point on the tool model 200 corresponds to the point at the first end of the tool path 202.

Once the tool model 200 is positioned, a series of individual, 2D slices are created along the 3D model of the virtual tool in the tool model 200, as shown in block 108. In a preferred embodiment, the 2D slices are taken along parallel planes with respect to one another. However, this need not be the case. For example, radial, irregular or non-parallel 2D slices may be appropriate, depending upon the tool, the specific tool path 202 through the workpiece, the blank and the like, as well as combinations including at least one of the foregoing.

Finally, in the 3D model of the workpiece, the master process model 20 each 2D slice created above is passed along the tool path 202 and through the dimension (initially of the virtual blank 10), as shown in block 110. The "material" within the master process model 20 that each 2D slice comes into contact with as it is swept along the tool path 202 is subtracted. After each 2D slice has been swept along the tool path 202, the "material" removal modeling and virtual machining is complete. Again, the particular level of accuracy of the virtual machining will depend upon how many 2D slices are used. Generally speaking, the desired number of 2D slices will depend upon the particular project associated with the virtual machining. However, the greater the number of slices used, improves accuracy, the slower the processing time of the computer to perform the modeling of the virtual machining.

The above-described method is more easily understood with reference to an exemplary "virtual" 3D tool 200, as is shown in FIGS. 3(a) through (c). More particularly, FIG. 3(a) shows a perspective view of an irregularly shaped, 3D tool model 200. A determined tool path 202 is delineated from a reference point on one face of the tool model 200. In FIG. 3(b), there is shown another perspective view of the tool model 200, along with a series of exemplary slices taken across slice planes 204. For ease of illustration, only five slice planes 204 are depicted. However, it should be appreciated that greater number of actual slices will be used to provide the degree of accuracy required in the simulation. In FIG. 3(c), the slice planes 204 are shown in a side view thereof to illustrate the irregular shape of the tool model 200.

Figure 4B:
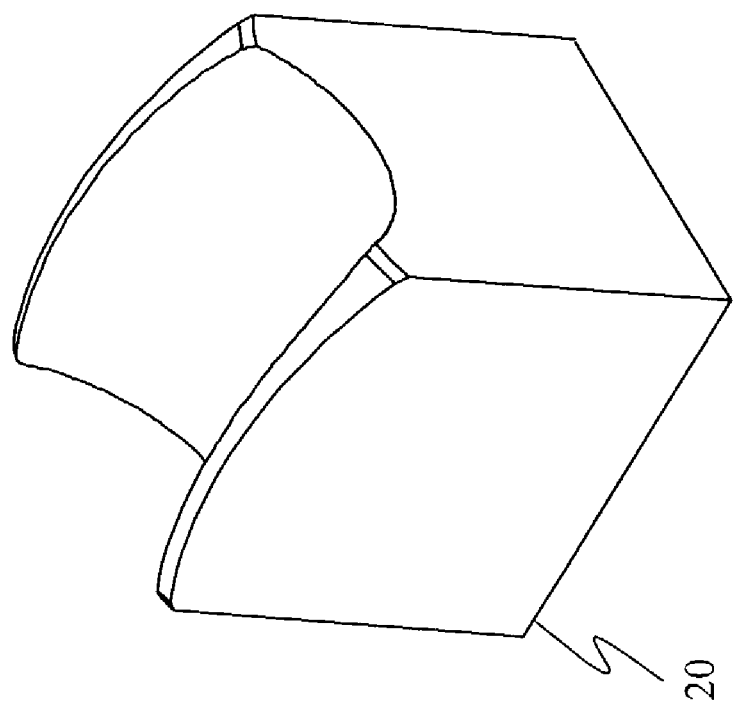
FIG. 4(b) is a perspective view of the workpiece of FIG. 3(a), following the simulated removal material in accordance with the method shown in FIG. 1;.
Figure 4A:
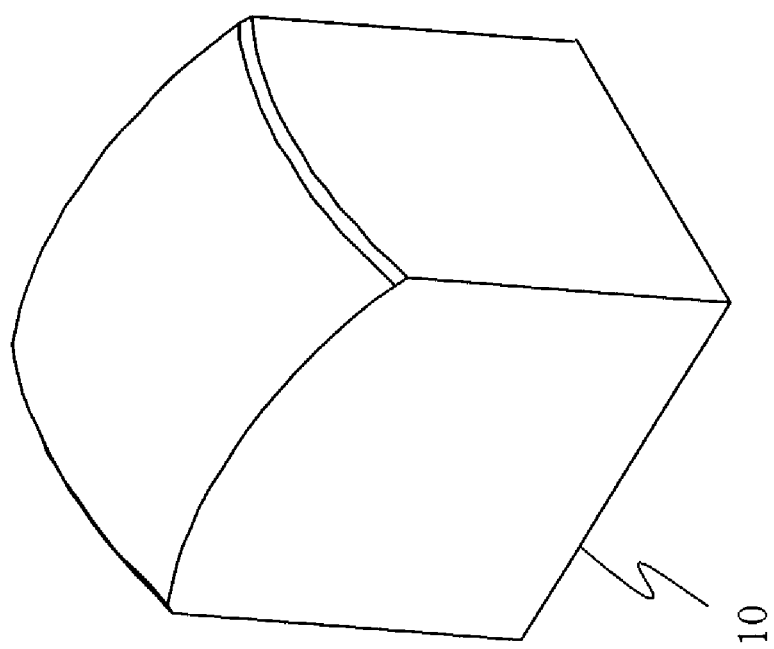
FIG. 4(a) is a perspective view of an exemplary workpiece prior to material removal.

Finally, FIG. 4(a) illustrates an exemplary model of a workpiece or virtual blank 120 and/or master process model prior to the passing of the slice planes 204 therethrough along the tool path 202. The end result of the simulated removal process of material in accordance with method 100 is the completed virtual machined part, master process model 20 is shown in FIG. 4(b).

It should be pointed out that the addition, creation and manipulation of the virtual tool in the tool model 200, workpiece model, virtual blank 10 and slice planes 204 may be done by conventional associative means, characteristic of a "vertical modeling" system. In such a system, modeling elements such as datum planes are created in reference to a base or parent feature. The datum planes, in turn, may be used to define placement and positioning references for other modeling elements such as positioning planes or form features. However, the removal of a parent feature results in the loss of association between subsequently designed child features and the parent feature, which, in turn, results in the loss of any additional features that are subsequently associated to the child features. Thus, any modifications of certain features using vertical modeling principals may require additional effort, due to the fact that if a parent feature is edited, then all children of the parent feature need to be edited as well.

In contrast, a horizontally structured modeling of the planes allows for the independent addition or subtraction of additional features. Such a horizontally structured coordinate system facilitates model generation wherein a feature is placed and positioned independently according to subsequently constrained refrences (e.g., coordinate system(s), datums, and the like). If a parent feature is removed, there will be no loss of any associated child features therewith. This independence of the various modeling elements also allows for the addition, subtraction, and reordering of new or existing modeling elements. Additional information regarding horizontally structured CAD/CAM and modeling systems may be found in commonly assigned U.S. Pat. No. 6,735,489, U.S. Pat. application Ser. No. 09/483,301, filed Jan. 14, 2000, by Pravin Khurana et al., and the abovementioned U.S. patent application Ser. No. 10/033,163, the disclosures of which are incorporated by reference herein in their entirety.

In yet another exemplary embodiment, various elements of the models, tool path, and the like may be developed employing horizontally structured modeling techniques. As stated above, horizontal modeling facilitates simple modifications to models without the rework and remodeling typical of more "vertical" methods as now used in the art. For example, the tool model, virtual blank, and tool path may readily be generated employing horizontal modeling. More particularly, the tool path, may readily be generated employing techniques disclosed in commonly assigned U.S. Patent application Ser. No. 10/355,749, entitled HORIZONTALLY STRUCTURED CAD/CAM COORDINATE SYSTEM filed Jan. 31, 2003, by Diane Landers et al., the disclosure of which is incorporated by reference herein in its entirety.

Horizontally Structured Coordinate System

In earlier embodiments of horizontally structured modeling, the Cartesian coordinate system employed as a reference for subsequent measurements and reference in the various models was undefined. To establish a coordinate system (herein a 3-D coordinate system), modeling elements such as datum planes were created in reference to a base feature. These datum planes were used to define placement and positioning references for other modeling elements such as form features.

Employing the abovementioned method, removal of the parent feature or datum plane results in a loss of associativity with the datum planes and the parent feature, which, in turn, results in the loss of any form features that are associated to these datums. Therefore, it would be beneficial to modify features and modeling elements without significant impact to the existing modeling elements.

One method of editing is to either delete features or modify them with the addition or subtraction of additional features. This approach can be time consuming and cumbersome. Moreover, datums that were previously either placed on or positioned relative to faces and edges, for example of a base feature, limit the manipulation of subsequent form features created in relationship to these datums. Namely because the associative relationship established between the datums and the features prohibits the independent manipulation of child features or removal of the parent feature.

Figure 10:
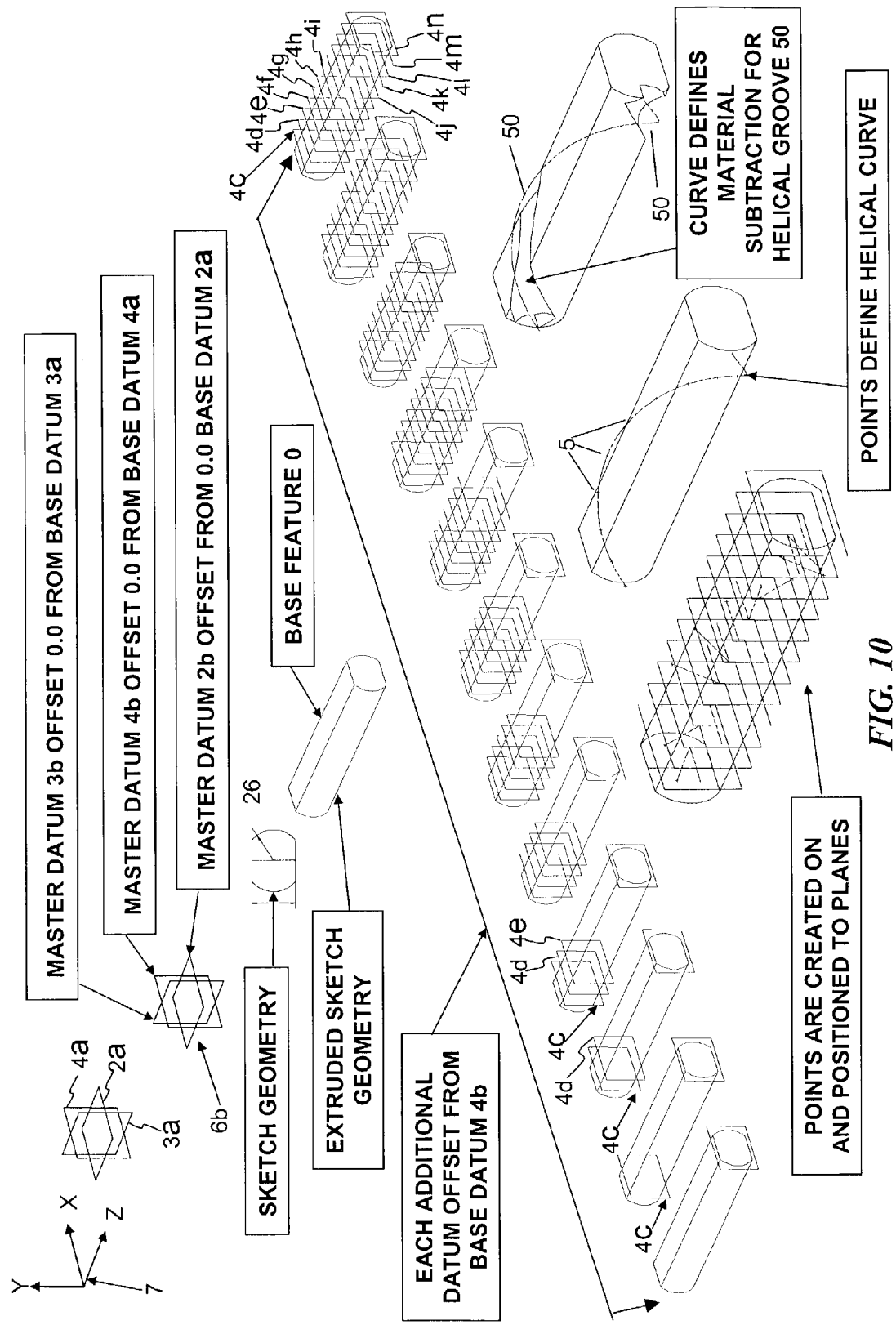
FIG. 10 illustrates an alternative embodiment for horizontally structured modeling with a horizontally constrained coordinate system for tool path definition.

Disclosed herein by way of an alternative embodiment is a methodology for establishing a reference coordinate system for subsequent modeling. Referring to FIG. 10, a 3-D coordinate system 6a is defined using three references in this instance, datum planes 2a, 3a, and 4a, respectively, denoted as base datums is created in accordance with an existing work coordinate system 7. The work coordinate system 7 is an arbitrary reference coordinate or measurement system inherent or generated in existing CAD systems. The references may be points, axes, lines, curves, datum planes, surfaces, bodies, regions, and the like, as well as combination including at least one of the foregoing. Hereinafter, the references shall be referred to as in this instance, datum planes 2a, 3a, and 4a respectively for clarity. Using datums, for example, these features become the basis of the horizontally structured model.

The 3-D coordinate system 6a comprising the datum planes 2a, 3a, and 4a may thereafter be referenced by subsequent constrained reference coordinate systems e.g., datums and/or modeling elements. The new configuration for the horizontally structured coordinate system facilitates model generation where a feature is placed and positioned, or an operation is performed independently according to the subsequent constrained references e.g., coordinate system(s), datums and the like. In such a configuration, if the parent feature is removed, there will be no loss of any associated child features. This independence of the various modeling elements also allows for the addition, subtraction, and reordering of new or existing modeling elements.

For example, a Cartesian coordinate system creates such a 3-D coordinate system. A base feature is then created and positioned relative to these datums. To illustrate, referring once again to FIG. 10, another 3-D coordinate system 6b comprising (in this example) a set of three additional datums may be established. The three new datums denoted as master datums 2b, 3b, and 4b respectively are depicted with a zero offset from the datums 2a, 3a, and 4a respectively. Further, a series of positioning datums 4c–4n is created, each depicted with offsets along the z-axis from master datum 4b. For example, as depicted in the figure, a base feature 0 is modeled as an extrusion from a geometry 26, in this instance, a rectangular shape with radial two radial opposing sides. The base feature 0 is modeled by translating the geometry 26 along the z-axis forming the solid model depicted. Thereafter, one or more additional datums e.g. 4c–4n are positioned with offsets along the z-axis. Each of the additional datums e.g. 4c–4n includes no associative relationship with another, only (in this instance) with datum 4b. Thereafter, additional modeling elements may be added with associative relationships to any of the datums where a modeling element, e.g., a form feature (5a for example) is referenced to one of the coordinate system e.g., 6a, datums etc. while another modeling element e.g., another form feature (5b for example) is referenced to coordinate system 6b, or a datum. Moreover as shown in the figure, a series of form features (or any modeling element for that matter) may be created each including associative relationships with one or more of the respective datums 4c–4n. In such a fashion, if the coordinates for a particular datum are later modified, the form features that include associative relationships with that particular datum would also include the modification.

For example, if datum 4*n* is later offset further along the Z-axis, the form features e.g., 5 that includes an associative relationship with that datum would also now include the modified offset. For example, as depicted in FIG. 10, the base feature 0 (depicted here as a rectangular shape with radial two radial opposing sides) is oriented along the z axis. Thereafter, a series of form features 5 (in this instance points) are determined and established along each of the datum planes 4*b*–4*n* respectively where the respective datum planes 4*b*–4*n* intersect the surface of the base feature 0, to establish a helical path 52 for a tool to follow. The base feature may then virtual machined with a selected tool of selected dimensions to establish a helical groove 50 cut into the base feature 0 and thereby completing a 3-D model for the part.

Additional references may be created and association established to the various references and modeling elements. The references may be points, axes, lines, curves, datum planes, surfaces, bodies, regions, and the like, as well as combination including at least one of the foregoing. In an exemplary embodiment, datums are described as references and various for features are created and positioned relative and associated to these datums. These datums may be positionally constrained with numeric values or expression parameters from existing modeling features, after which, all consecutive child modeling elements features are created preferably using the Horizontally Structured CAD/CAM Modeling techniques as described above.

Virtual Inspection

Figure 5:
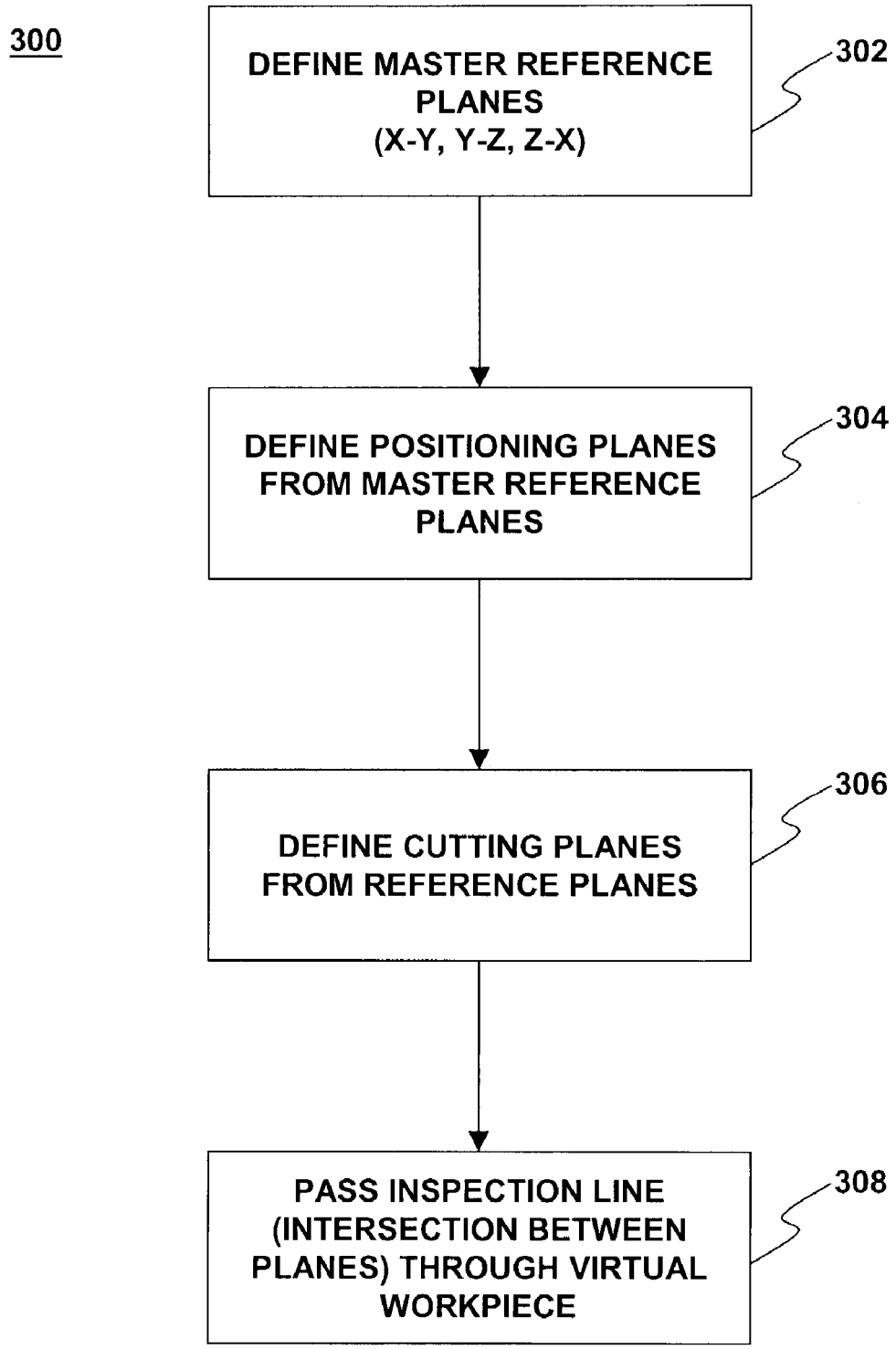
FIG. 5 is a block diagram illustrating a method for implementing a virtual inspection of a virtually machined workpiece, in accordance with an embodiment of the invention.
Figure 8A:
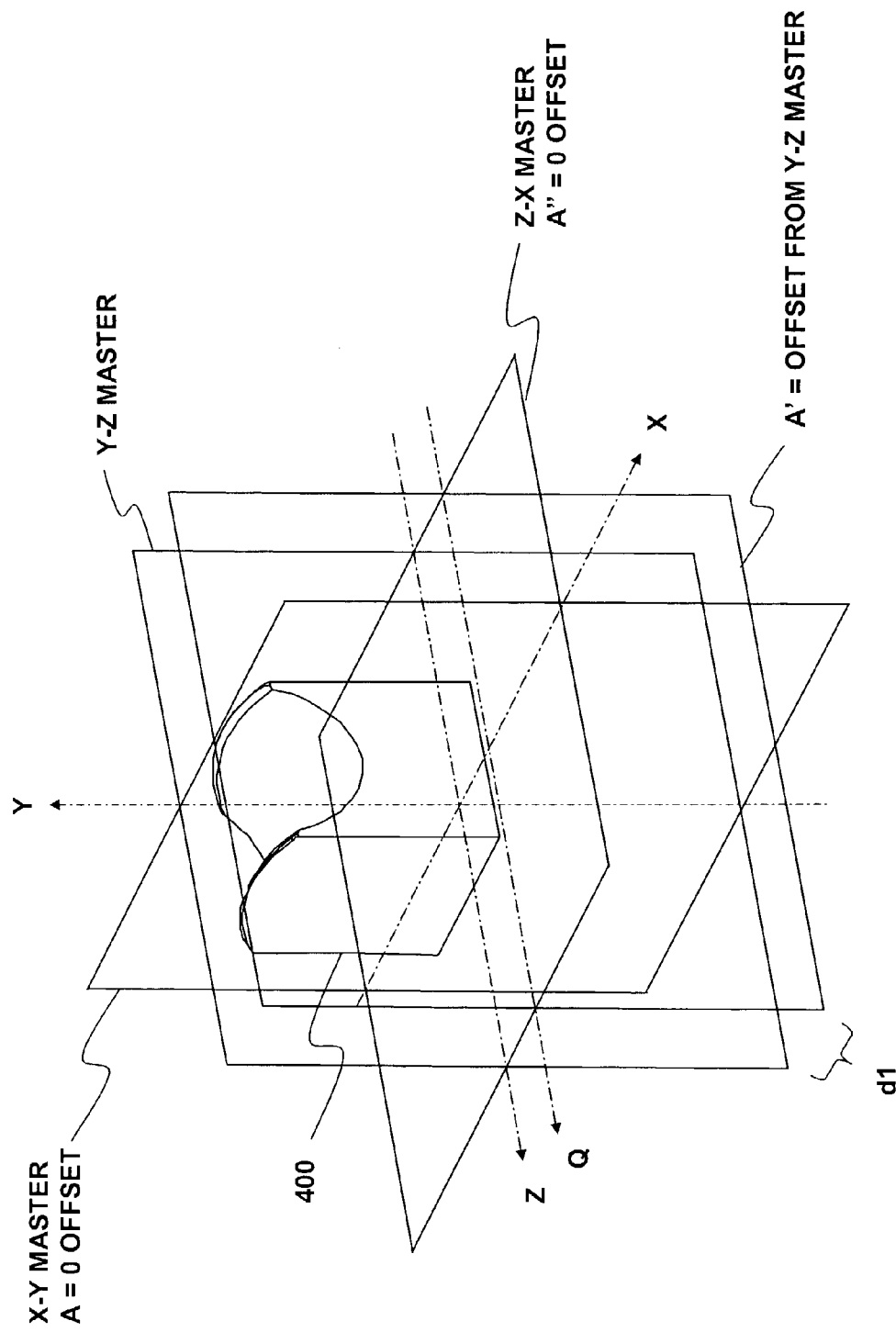
FIGS. 8(a) through 8(g) are perspective views which further illustrate the exemplary process of FIGS. 7(a) through 7(c), shown along with a virtually machined workpiece positioned with respect to the set of fixed master planes shown in FIG. 6.
Figure 8B:
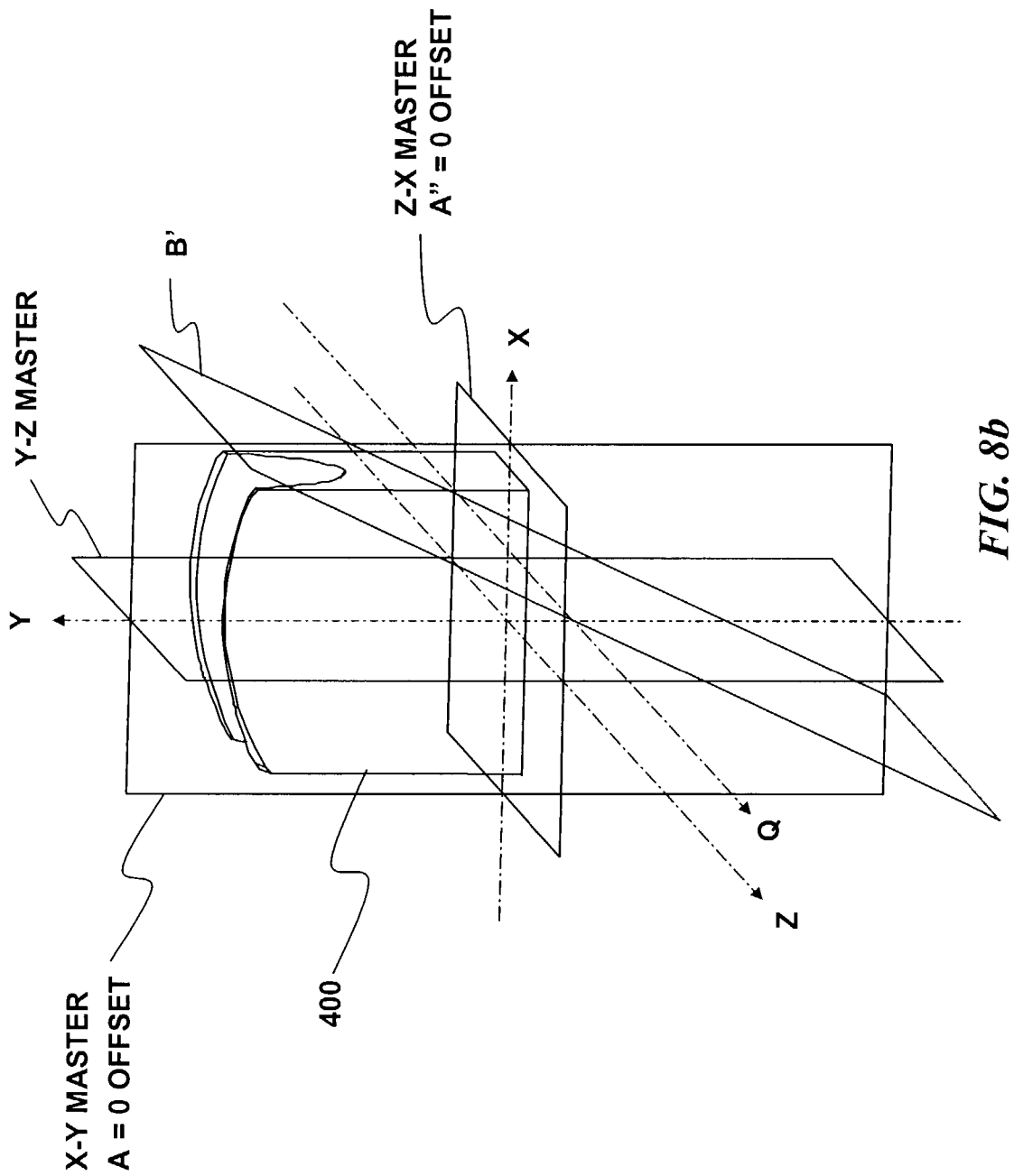
Figure 8C:
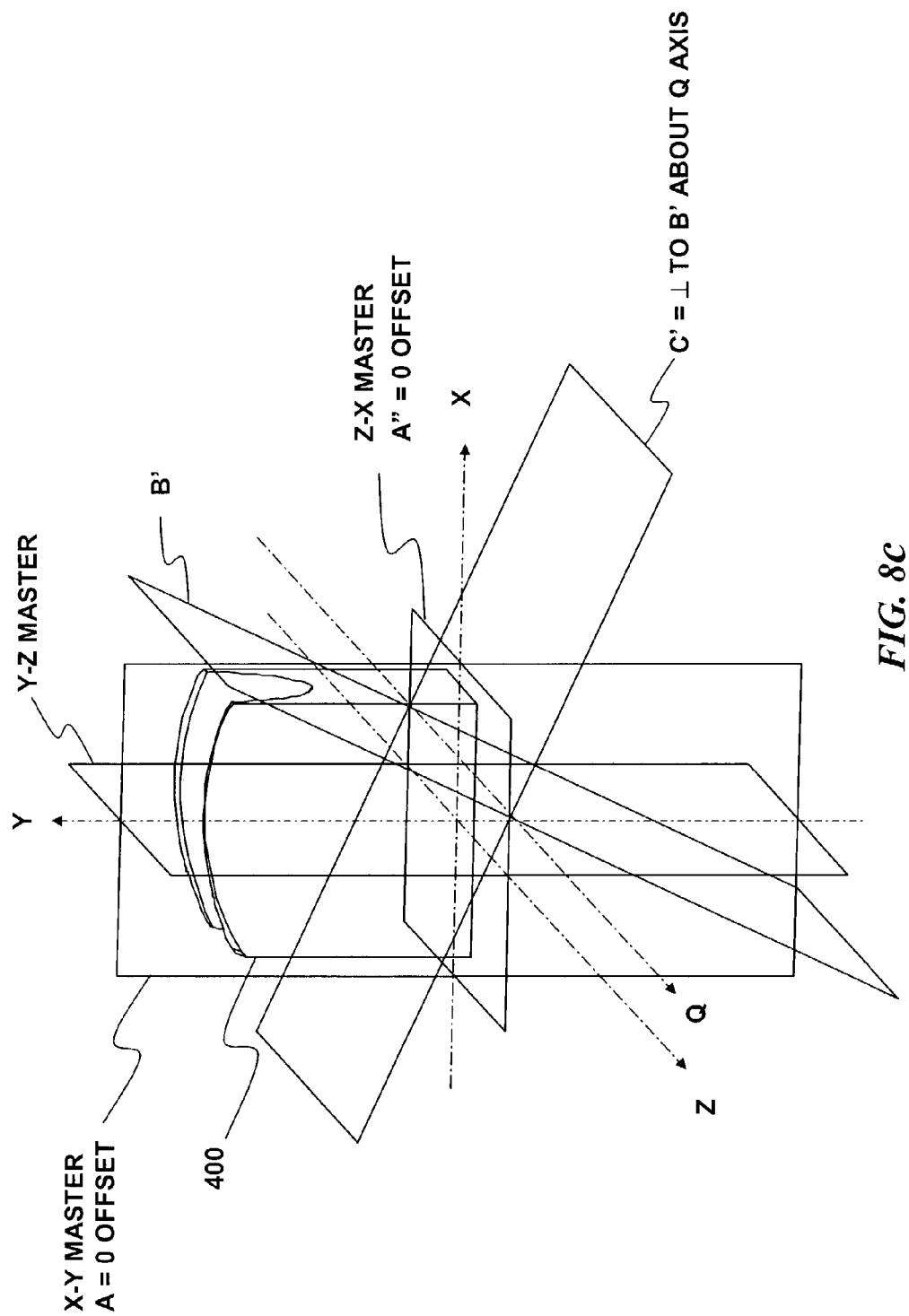
Figure 8D:
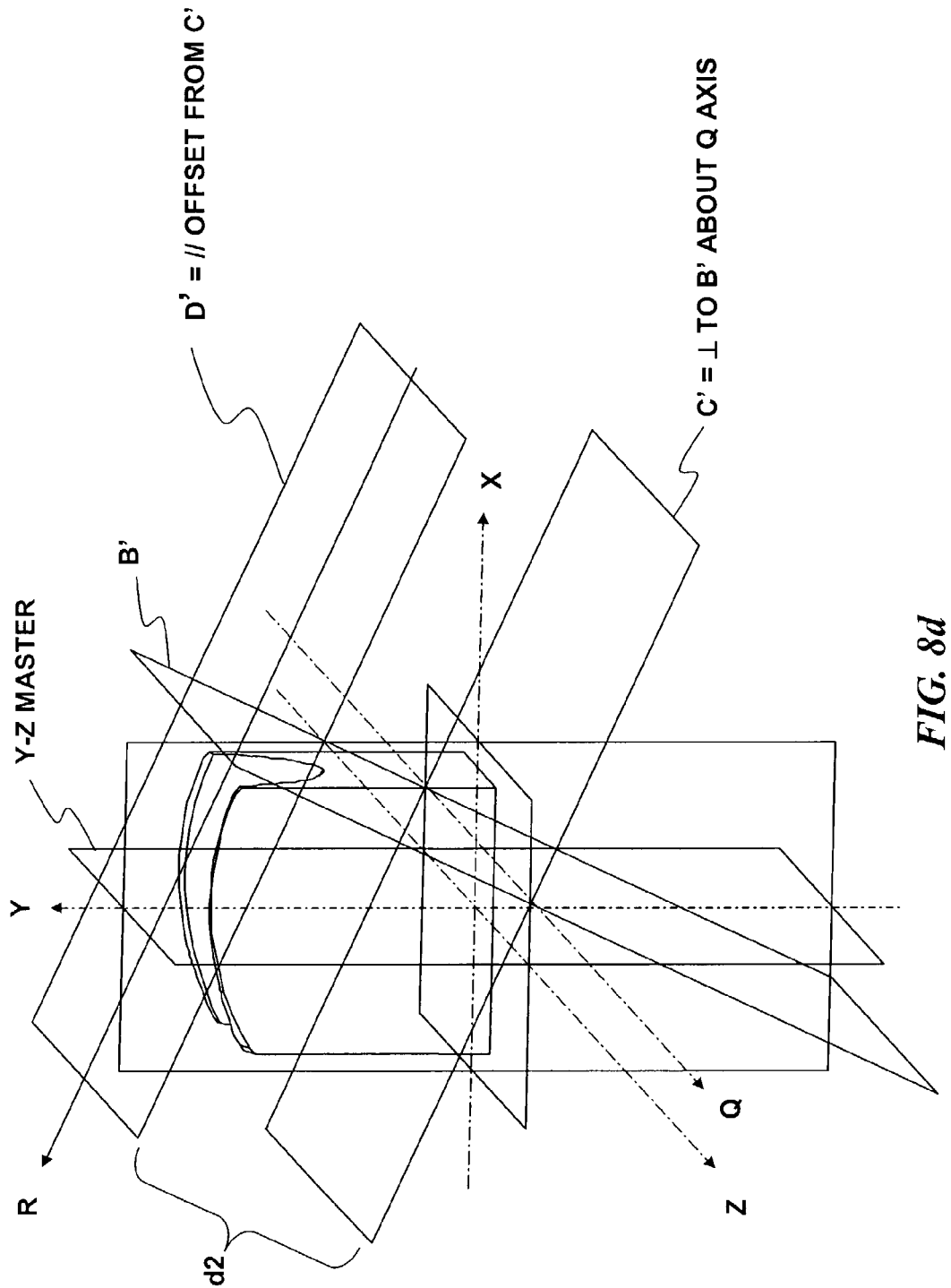
Figure 8E:
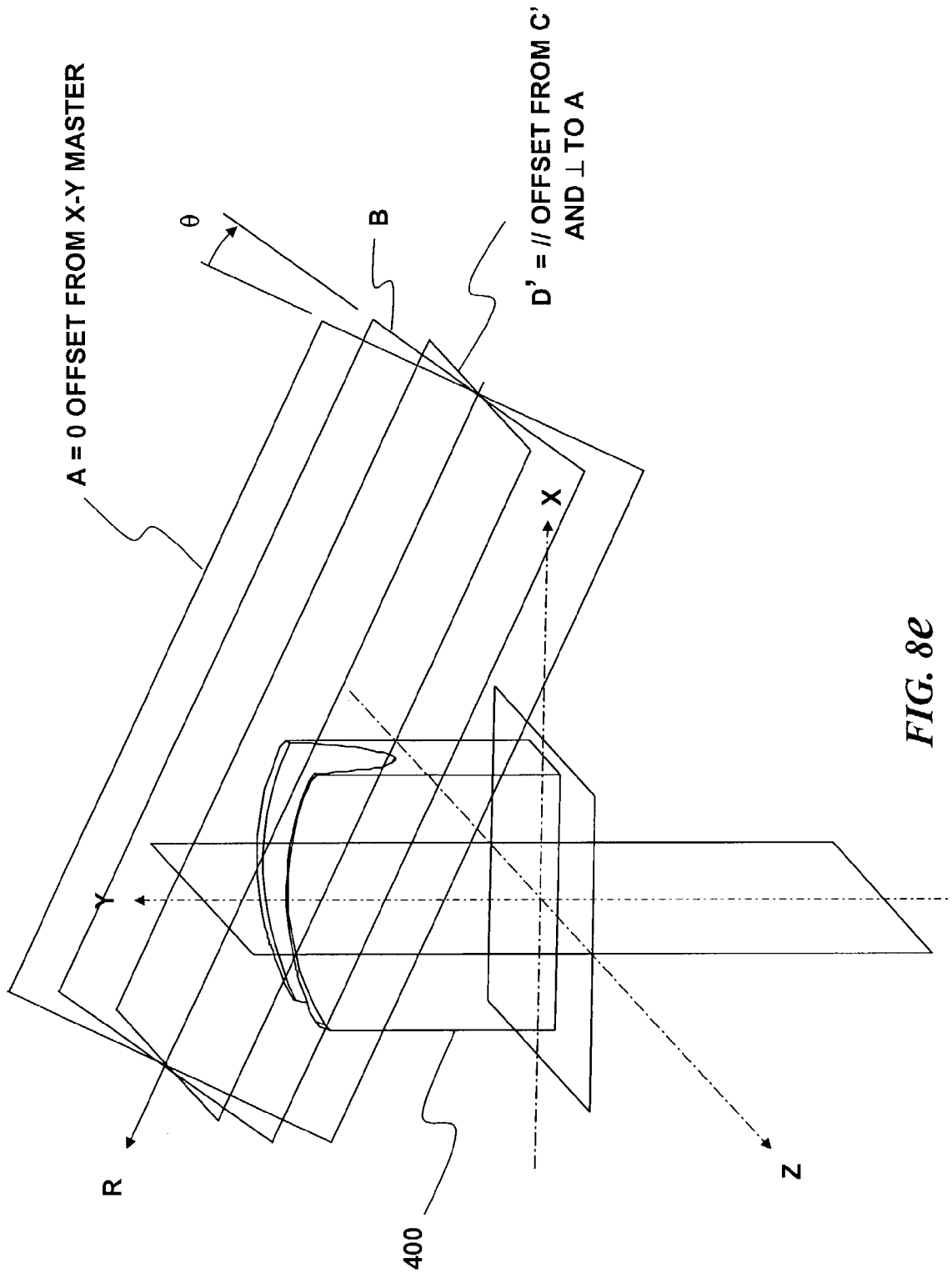
Figure 8F:
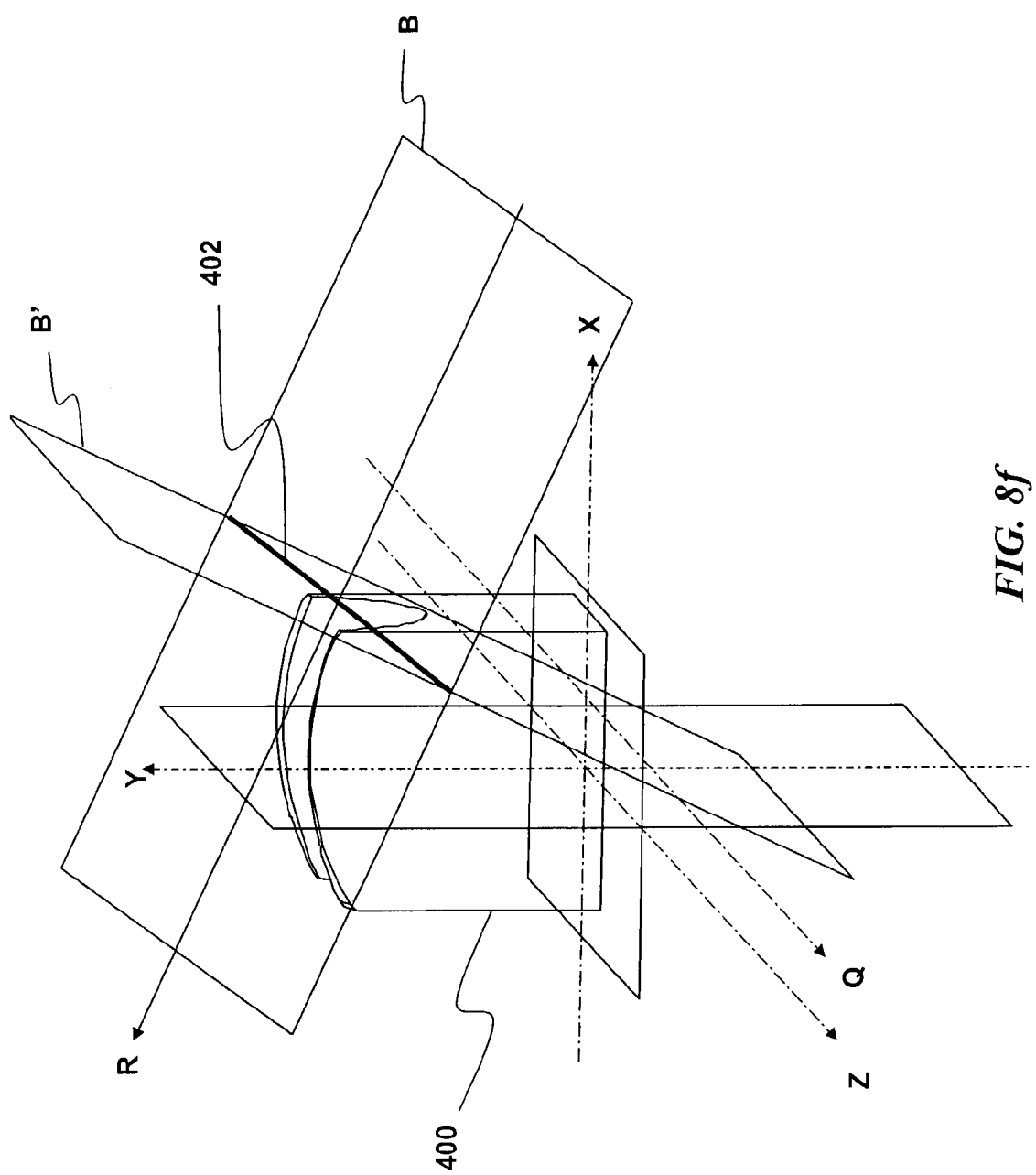
Figure 8G:
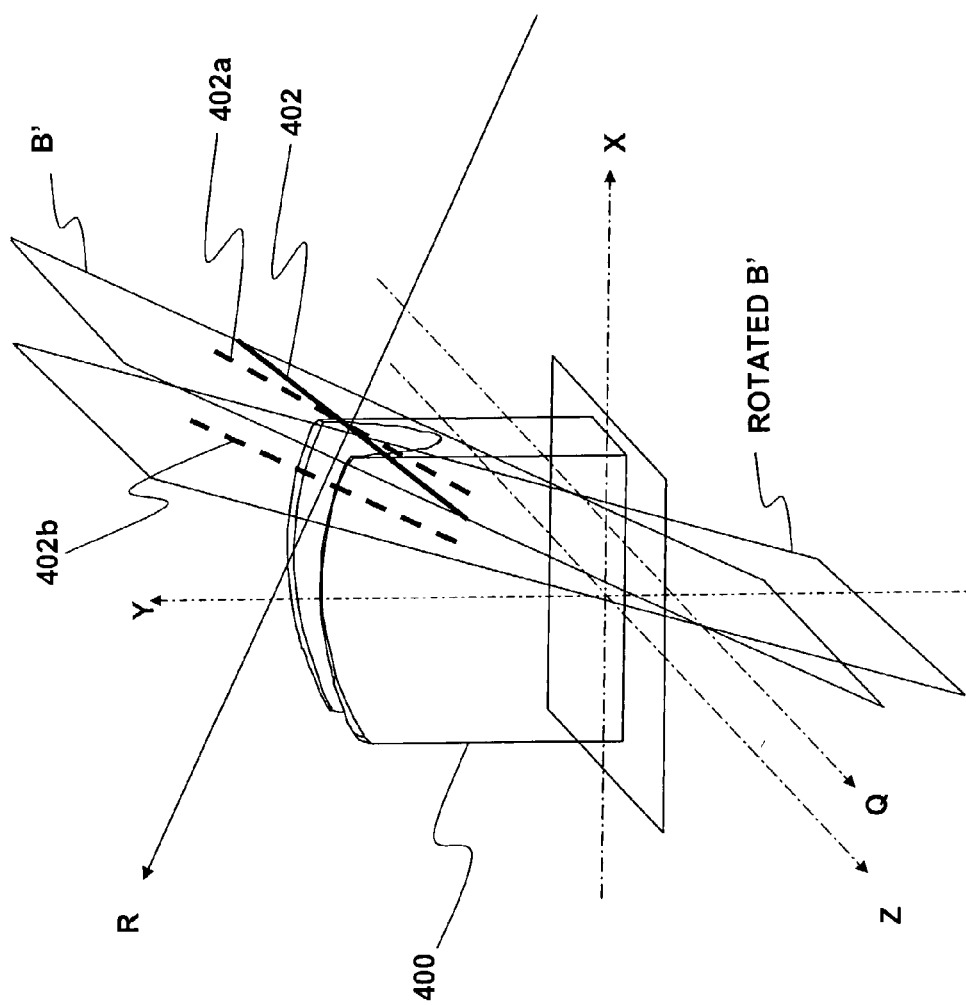

Referring initially to FIG. 5, there is shown a block diagram that illustrates a method 300 for implementing a virtual inspection of a virtually machined virtual workpiece or virtual blank, as described above. The method 300 begins at block 302, where a series of three mutually perpendicular, fixed master reference planes are defined; More particularly, the fixed master planes are designated as an x-y plane, a y-z plane and a z-x plane, as is shown in FIG. 6. Once the master reference planes have been defined, a set of positioning planes may be defined therefrom, as shown at block 304. The positioning planes will include a set of "offset" planes, which may be positioned parallel with respect to the master planes. In addition, the positioning planes will also include one or more perpendicular or parallel planes disposed with respect to the cutting planes, as described later.

Method 300 then continues to block 306, where a pair of cutting planes are defined from the positioning planes. As stated earlier, the cutting planes are not parallel with respect to one another, and therefore intersect at a line, referred to hereinafter as an inspection line. At block 308, the inspection line is used as a virtual inspection probe to be passed through a virtually machined workpiece. Each cutting plane is pivotally disposed about a defined axis, thus the inspection line may be through along a desired area of the workpiece by rotating one or both of the cutting planes.

The above-described process is further understood with reference to FIGS. 7(*a*) through 7(*c*), which illustrate the formation of exemplary cutting planes. FIG. 7(*a*) shows the location of defined positioning planes A, A' and A", associated with the x-y, y-z and z-x master planes, respectively. In the present example, positioning plane A is set to have an offset of zero, thus positioning plane A is equal to the x-y master plane in this instance. In addition, positioning plane A" is also set to have an offset of zero, meaning A" lies in the z-x master plane. However, positioning plane A' is defined with an offset distance along the positive x-axis direction, and therefore A' is parallel to the y-z master plane. It can be seen, therefore that the intersection of A' and A" (z-x master plane), defines a line which is designated as the Q-axis.

Referring now to FIG. 7(*b*), a first cutting plane, B', is defined. It will be noted that FIG. 7(*b*) is a view taken along the negative z-direction with respect to FIG. 7(*a*). Beginning with position plane A', the first cutting plane B' may occupy any planar position that pivots about the Q-axis. By way of example, B' is rotated by an acute angle, α, from A'. The first cutting plane B' will control the path position for the subsequently defined inspection line along the virtual workpiece. Once B' is defined, another positioning plane, C', is defined as being perpendicular to B'. If B' is caused to be rotated, then C' is correspondingly rotated to maintain its perpendicular orientation with respect to B'.

Next, another positioning plane, D', is defined as a parallel offset to C', as also shown in FIG. 7(*b*). The resulting intersection of positioning planes D' and A yields another line which is designated as the R-axis. From the R-axis, a second cutting plane, B, is defined as being capable of occupying any planar position pivoting about the R-axis, beginning with positioning plane A. The second cutting plane B will control the contact angle between the inspection line and the surface of the workpiece. FIG. 7(*c*) is a view along the R-axis direction, and more clearly illustrates the relationship between second cutting plane B and positioning plane A. By way of example, second cutting plane B is shown offset from positioning plane by an acute angle, θ, about the R-axis.

FIG. 7(*c*) also illustrates a pair of additional planes, C and D, which are offset from the x-y master plane on opposite sides of positional plane A. Planes C and D are used as "trim planes" to establish boundaries for second cutting plane B as it pivots about the R-axis.

Referring now to FIG. 7(*a*), there is shown a virtually machined virtual workpiece 400 (e.g. the completed process model 20 from above), a resultant 3D solid model following a virtual machining process, positioned with respect to the master planes, x-y, y-z and z-x. Also shown are the positioning planes A, A' and A" associated with the master planes. It will be recalled that positioning planes A and A" have a zero offset in this example, and thus are equivalent to the x-y and z-x master planes, respectively. As can be seen, the positioning plane A' is defined as being offset and parallel to the y-z master plane by a distance $d_1$, along the positive x direction. Thereby, the Q-axis is defined by the intersection of A' and A".

FIG. 8(*b*) illustrates an exemplary location for the first cutting plane, B'. As is shown, B' is rotated from the initial location at A' (not shown in FIG. 8(*b*)) about the Q-axis. Correspondingly, FIG. 8(*c*) illustrates positioning plane C' shown in its perpendicular orientation with respect to B', about the Q-axis. Then, in FIG. 8(*d*), positioning plane D' is shown as being perpendicular to positioning plane C', and offset a distance $d_2$ therefrom. (For ease of illustration, the master planes are not shown in FIG. 8(*d*).) The resulting intersection of positioning plane D' and positioning plane A (i.e., the x-y master plane in this instance) defines the R-axis.

FIG. 8(*e*) illustrates the definition of the second cutting plane, B. It will be recalled that second cutting plane B begins in positioning plane A, and pivots about the R-axis. Thus, second cutting plane B is shown in FIG. 8(*e*) as being rotated from positioning plane A by an angle θ.

Referring now to FIG. 8(*f*), the intersection of the first and second cutting planes B', B is illustrated, thereby defining the inspection line 402 (shown as a darkened segment).

Ultimately, the virtual length of the inspection line 402 may be controlled by using trim planes (not shown) to define boundaries for the cutting planes, as was described in FIG. 7(c). Furthermore, by changing the angle of the first cutting plane B' with respect to the Q-axis the path position of the inspection line 402 may be changed, as shown by dashed line 402a. Similarly, a change in the angle of the second cutting plane, B, results in a change in the contact angle between the inspection line 402 and the virtual workpiece 400, as shown by dashed line 402b.

Figure 9:
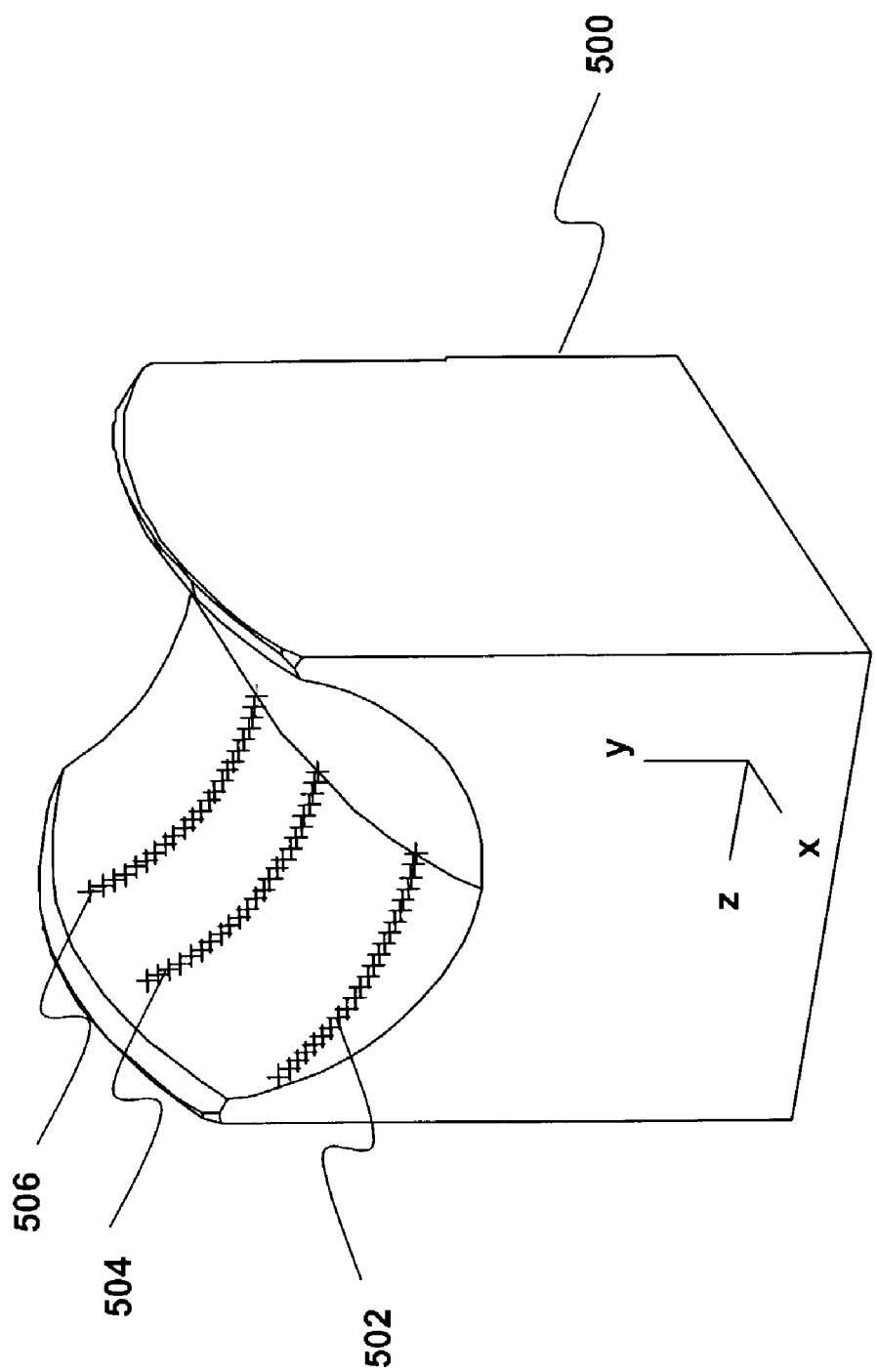
FIG. 9 illustrates a finished virtual workpiece along with sets of data inspection points taken in accordance with the virtual inspection method of FIG. 5.

Finally, FIG. 9 illustrates another example of a virtual workpiece 500 having a series of inspection data points 502 generated thereupon through the use of the above-described method. The individual data points are shown as small x's along the contoured surface of the workpiece 500. Again, each data point represents the intersection of the inspection line described earlier and the surface of the virtual workpiece 500. In studying the pattern of x's shown on the workpiece 500, it can be seen that a first group (path) of data points 504 may be taken by keeping the first cutting plane B' at a constant angle and sweeping the second cutting plane B along a determined angular path about the R-axis. Then, another group of data points 506 may be taken by adjusting the angle of the first cutting plane B' at a new constant angle and then re-sweeping B along the same angular path as above. The process can be repeated depending on the location and accuracy of the inspection required.

Employing the above described method, a virtual inspection process may be implemented for a virtually designed and machined part. Once the part is positioned with respect to a set of master reference (datum) planes, any point may be measured thereon by creating the inspection line from the cutting planes. The location of the inspection line is determined by the relative position of the two cutting planes, which, in turn, is established by the location of positioning planes with respect to the master planes. It will be appreciated that the illustrations discussed above are exemplary in nature and should not be interpreted in any limiting manner. For example, each of the positioning planes A, A' and A" could have been offset a distance from their respective master reference planes (instead of just A' as discussed earlier).

Although the generation of the inspection line 402 is preferably implemented through the generation of the planes as discussed, those skilled in the art will appreciate that other methods may also be used in this regard. For example, since two points determine a line, the inspection line 402 could also be defined by manipulating a pair of points in a coordinate space. However, since the manipulation of planes may be accomplished by translation or pivoting about an axis, the above planar method is preferred in ultimately generating and manipulating the inspection line 402.

In addition, the creation and manipulation of the reference, position and cutting planes may be done by conventional associative means, characteristic of a "vertical modeling" system. In such a system, modeling elements such as datum planes are created in reference to a base or parent feature. The datum planes, in turn, may be used to define placement and positioning references for other modeling elements such as positioning planes or form features. However, the removal of a parent feature results in the loss of association between subsequently designed child features and the parent feature, which, in turn, results in the loss of any additional features that are subsequently associated to the child features. Thus, any modifications of certain features using vertical modeling principals may require additional effort, due to the fact that if a parent feature is edited, then all children of the parent feature need to be edited as well.

In contrast, a horizontally structured modeling of the planes allows for the independent addition or subtraction of additional features. Such a horizontally structured coordinate system facilitates model generation wherein a feature is placed and positioned independently according to subsequently constrained references (e.g., coordinate system(s), datums, and the like). If a parent feature is removed, there will be no loss of any associated child features therewith. This independence of the various modeling elements also allows for the addition, subtraction, and reordering of new or existing modeling elements. Additional information regarding horizontally structured CAD/CAM and modeling systems may be found in U.S. patent application Ser. No. 6,735,489.

Returning now to FIG. 1 for additional discussion of the integration of the abovementioned methodologies. In yet another exemplary embodiment, the methodology disclosed herein may further be integrated with analysis tools formulated to automate the processes disclosed. In on embodiment, the inspection process may be integrated with a data array as may be generated in a spread sheet to facilitate comparison and evaluation of the measurements made during the virtual inspection. Moreover, in yet another embodiment, links to the tool model 200 or the path definition may be incorporated to provide for automatic modifications thereto to facilitate enhancing the accuracy of the virtual machining and inspection. Advantageously such processes would readily automate the prototyping and inspection process employed today potentially reducing product prototyping and manufacturing engineering time from weeks to minutes and eliminating thousands of dollars of prototyping and design costs.

While the invention has been described with reference to a preferred embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A computer implemented method for virtual machining and inspection of a three-dimensional virtual workpiece model representative of an actual workpiece comprising:

creating a three-dimensional tool model;

defining a tool path through the virtual workpiece model;

creating a plurality of two-dimensional slices from said three-dimensional tool model; and passing each of said plurality of two-dimensional slices along said tool path and through the virtual workpiece model;

wherein material from the virtual workpiece model coming into contact with each of said plurality of two-dimensional slices passed therethrough is subtracted from the virtual workpiece model; and conducting a virtual inspection of said virtual work piece model, comprising; generating an inspection line, said inspection line being used to intersect with the virtual workpiece model, to define an inspection point;

wherein said inspection line is swept through a selected area of the virtual workpiece model, thereby collecting inspection data for the workpiece.

2. The method of claim 1, further comprising positioning said three-dimensional tool model at one end of said tool path prior to creating said plurality of two-dimensional slices.

3. The method of claim 2, wherein said plurality of two-dimensional slices are taken along corresponding slice planes, each of said slice planes being parallel to one another.

4. The method of claim 2, wherein said three-dimensional tool model is positioned at said one end of said tool path at a reference point of said three-dimensional tool model.

5. The method of claim 1, wherein generating said inspection line further comprises:
defining a set of master reference planes;
defining a set of positioning planes with respect to said set of master reference planes; and
defining a pair of intersecting cutting planes from said set of positioning planes;
wherein said inspection line is defined at the intersection of said pair of intersecting cutting planes.

6. The method of claim 5, wherein said pair of intersecting cutting planes further comprise:
a first cutting plane, said first cutting plane being rotatable about a first axis; and
a second cutting plane, said second cutting plane being rotatable about a second axis;
wherein rotation of said first cutting plane determines a path position of said inspection line, and rotation of said second cutting plane determines a contact angle between said inspection line and the virtual workpiece model.

7. The method of claim 6, wherein said first axis is defined by the intersection between a first positioning plane and a second positioning plane.

8. The method of claim 7, wherein said second axis is defined by the intersection between a third positioning plane and a fourth positioning plane, said fourth positioning plane being perpendicular to said first cutting plane.

9. The method of claim 1, wherein said defining a tool path through the virtual workpiece model further includes employing a horizontally constructed coordinate system to define a plurality of points indicative of a desired tool path.

10. The method of claim 1 further including linking at least one of said virtual workpiece model; said three-dimensional tool model; and said tool path through the virtual workpiece model to a template file.

11. The method of claim 10, further comprising:
unlinking at least one of said virtual workpiece model, said three-dimensional tool model, and said tool path through the virtual workpiece model, from the template file; and
relinking at least one of another virtual workpiece model, another three-dimensional tool model, and another tool path through the virtual workpiece model to the template file, respectively.

12. A storage medium, comprising:
a machine readable computer program code for virtual machining and inspection of a three-dimensional virtual workpiece model representative of an actual workpiece; and
instructions for causing a computer to implement a method, the method further comprising;
creating a three-dimensional tool model;
defining a tool path through the virtual workpiece model;
creating a plurality of two-dimensional slices from said three-dimensional tool model; and
passing each of said plurality of two-dimensional slices along said tool path and through the virtual workpiece model;
wherein material from the virtual workpiece model coming into contact with each of said plurality of two-dimensional slices passed there through is subtracted from the virtual workpiece model; and
conducting a virtual inspection of said virtual work piece model, comprising: generating an inspection line, said inspection line being used to intersect with the virtual workpiece model to define an inspection point;
wherein said inspection line is swept through a selected area of the virtual workpiece model, thereby collecting inspection data for the workpiece.

13. The storage medium of claim 12, further comprising positioning said three-dimensional tool model at one end of said tool path prior to creating said plurality of two-dimensional slices.

14. The storage medium of claim 12, wherein generating said inspection line further comprises:
defining a set of master reference planes;
defining a set of positioning planes with respect to said set of master reference planes; and
defining a pair of intersecting cutting planes from said set of positioning planes;
wherein said inspection line is defined at the intersection of said pair of intersecting cutting planes.

15. The storage medium of claim 14, wherein said pair of intersecting cutting planes further comprise:
a first cutting plane, said first cutting plane being rotatable about a first axis; and
a second cutting plane, said second cutting plane being rotatable about a second axis;
wherein rotation or said first cutting plane determines a path position of said inspection line, and rotation of said second cutting plane determines a contact angle between said inspection line and the virtual workpiece model.

16. The storage medium of claim 12, wherein said defining a tool path through the virtual workpiece model further includes employing a horizontally constructed coordinate system to define a plurality of points indicative of a desired tool path.

17. The storage medium of claim 12 further including linking at least one of said virtual workpiece model; said three-dimensional tool model; and said tool path through the virtual workpiece model to a template file.

18. The storage medium of claim 17, further comprising:
unlinking at least one of said virtual workpiece model, said three-dimensional tool model, and said tool path through the virtual workpiece model, from the template file; and
relinking at least one of another virtual workpiece model, another three-dimensional tool model, and another tool path through the virtual workpiece model, respectively, to the template file.

19. A computer data signal embodied in a computer readable medium, comprising:
code configured to cause a processor to implement a method for virtual machining and inspection of a three-dimensional virtual workpiece model representative of an actual workpiece, the method further comprising:

creating a three-dimensional tool model;
defining a tool path through the virtual workpiece model;
creating a plurality of two-dimensional slices from said three-dimensional tool model; and
passing each of said plurality of two-dimensional slices along said tool path and through the virtual workpiece model;
wherein material from the virtual workpiece model coming into contact with each of said plurality of two-dimensional slices passed therethrough is subtracted from the virtual workpiece model; and
conducting a virtual inspection of said virtual work piece model, comprising: generating an inspection line, said inspection line being used to intersect with the virtual workpiece model to define an inspection point;
wherein said inspection line is swept through a selected area of the virtual workpiece model, thereby collecting inspection data for the workpiece.

20. The computer data signal of claim 19, further comprising positioning said three-dimensional tool model at one end of said tool path prior to creating said plurality of two-dimensional slices.

21. The computer data signal of claim 19, wherein generating said inspection line further comprises:
defining a set of master reference planes;
defining a set of positioning planes with respect to said set of master reference planes; and
defining a pair of intersecting cutting planes from said set of positioning planes;
wherein said inspection line is defined at the intersection of said pair of intersecting cutting planes.

22. The computer data signal of claim 21, wherein said pair of intersecting cutting planes further comprise:
a first cutting plane, said first cutting plane being rotatable about a first axis; and
a second cutting plane, said second cutting plane being rotatable about a second axis;
wherein rotation of said first cutting plane determines a path position of said inspection line, and rotation of said second cutting plane determines a contact angle between said inspection line and the virtual workpiece model.

23. The computer data signal of claim 19, wherein said defining a tool path through the virtual workpiece model further includes employing a horizontally constructed coordinate system to define a plurality of points indicative of a desired tool path.

24. The computer data signal of claim 19 further including linking at least one of: said virtual workpiece model; said three-dimensional tool model; and said tool path through the virtual workpiece model to a template file.

25. The computer data signal of claim 24, further comprising:
unlinking at least one of said virtual workpiece model, said three-dimensional tool model, and said tool path through the virtual workpiece model from the template file; and
relinking at least one of another virtual workpiece model, another three-dimensional tool model, and another tool path through the virtual workpiece model, respectively, to the template file.

* * * * *